UNITED STATES PATENT OFFICE.

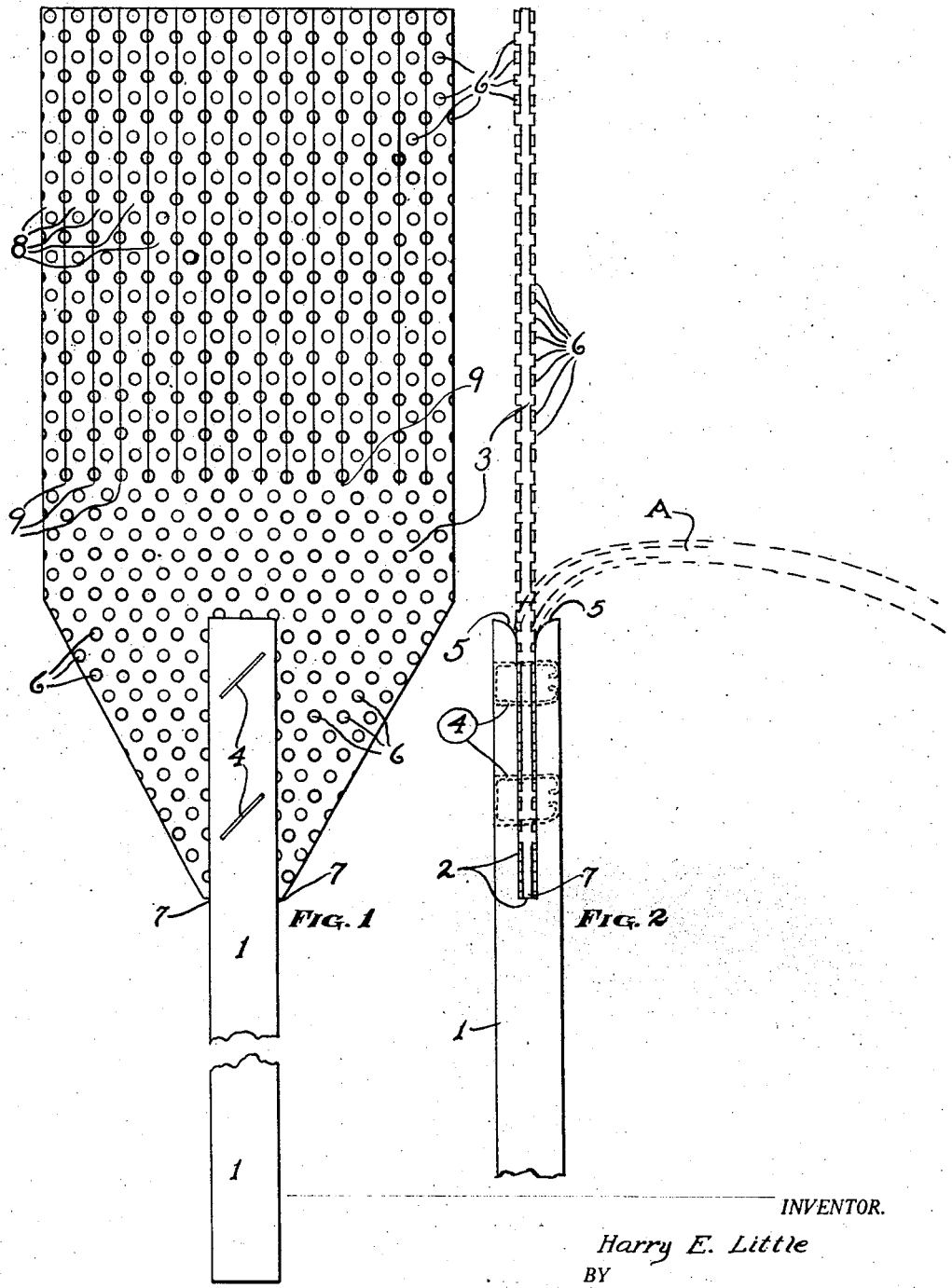

HARRY E. LITTLE, OF WICHITA, KANSAS.

INSECT SWATTER.

1,412,312. Specification of Letters Patent. Patented Apr. 11, 1922.

Application filed August 18, 1921. Serial No. 493,375.

*To all whom it may concern:*

Be it known that I, HARRY E. LITTLE, a citizen of the United States, residing at Wichita, in the county of Sedgwick and State of Kansas, have invented certain new and useful Improvements in Insect Swatters, of which the following is a description, referring to the drawings which accompany this specification.

My invention relates to insect swatters composed of a rubber flapper with a handle rigidly attached.

The object of my invention is to manufacture an insect swatter of refuse material such as old rubber tubing from automobile tubes flattened by a heating process and at the same time embossing the surface for the purposes hereinafter described.

Another object of my invention is to provide a flexible sheet with protrusions that will contact the surface to which the stroke is applied without excluding all the air from between the surfaces proper and also the stroke on a fly will not mash every particle of its body effecting a smear or excessive mangling of its body.

Further objects of my invention will be disclosed in the description of the drawings in which Fig. 1 is a side view of the swatter Fig. 2 is an edge view showing the flaring ends of the handle engaging the flexible sheet as shown by dotted lines. 1 is the handle which is made of wood and is slotted at one end as shown at 2, the object of which is to receive the flapper 3. When said flapper is placed in the slot a plurality of staples as shown at 4 are driven and clinched on the opposite side by which means the flapper 3 is firmly held in place, said flapper being flexible it will bend as shown by dotted line A when a stroke is being made for the purpose of killing a fly or other insect, and to prevent the flapper from tearing or wearing a hole by bending over the ends of the handle as indicated by dotted lines A, the inside corners are rounded as shown at 5, in Fig. 2. The flapper 3 has protruding members 6 equally distributed on both sides and said protrusions function as contact members when the stroke is made at flies or other insects.

The flapper has two of its corners cut tapering to intersect with the sides of the handle as shown at 7 and the opposite end of said flapper is cut in strips as shown at 8, said cuts terminating at pproximately the center as shown at 9, the object of which is to allow free passage of air between said strips so that the concussion of the stroke will not be sufficient to exclude the insect from being caught by the stroke.

Such modifications may be employed as lie within the appended claim.

Having thus described my invention, what I claim as new and desire to secure by Letters Patent is:

In an insect swatter, a slotted handle with terminating converging ends, a rubber flapper with tapering edges and the opposite end of said flapper cut into a plurality of strips longitudinally with said flapper and terminating near its center, protruding disc like members on both sides of said flapper geometrically and equally distributed thereon, said flapper being adapted to engage within the walls of said slot, staples passing through the side walls and that portion of said flapper interposed within said slot and the ends of said staples clinched to bind said members firmly together for the purposes set forth and described.

HARRY E. LITTLE.

Witnesses:
M. Y. CHARLES,
E. SAWYER.